United States Patent
Ishizaki et al.

(10) Patent No.: US 11,407,159 B2
(45) Date of Patent: Aug. 9, 2022

(54) METHOD FOR INJECTION-MOLDING THERMOSETTING RESIN COMPOSITION

(71) Applicant: SOMAR CORPORATION, Tokyo (JP)

(72) Inventors: Hirohisa Ishizaki, Tokyo (JP); Akira Ochiai, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 6 days.

(21) Appl. No.: 15/568,403

(22) PCT Filed: Apr. 18, 2016

(86) PCT No.: PCT/JP2016/062237
§ 371 (c)(1),
(2) Date: Oct. 20, 2017

(87) PCT Pub. No.: WO2016/171099
PCT Pub. Date: Oct. 27, 2016

(65) Prior Publication Data
US 2018/0099445 A1    Apr. 12, 2018

(30) Foreign Application Priority Data

Apr. 21, 2015    (JP) .............................. JP2015-087029

(51) Int. Cl.
*B29C 45/78*    (2006.01)
*C08K 3/36*    (2006.01)
(Continued)

(52) U.S. Cl.
CPC .......... *B29C 45/78* (2013.01); *B29C 45/7207* (2013.01); *C08K 3/36* (2013.01);
(Continued)

(58) Field of Classification Search
CPC ................ B29C 45/78; B29C 45/7207; B29C 2045/0058; B29C 2045/1833;
(Continued)

(56) References Cited

U.S. PATENT DOCUMENTS 3,698,849 A * 10/1972 Czerski ................. B29C 44/086
425/567
3,859,406 A * 1/1975 Czerski ................. B29C 44/425
264/51
(Continued)

FOREIGN PATENT DOCUMENTS

CN    103009631 A    4/2013
JP    H10-511323 A    11/1998
(Continued)

OTHER PUBLICATIONS

Machine Translation for Watanabe Patent JP2002-240094, Generated on Jun. 11, 2019 https://patents.google.com/patent/JP2002240094A/en?oq=2002240094. (Year: 2001).*
(Continued)

*Primary Examiner* — Kelly M Gambetta
*Assistant Examiner* — Andrés E. Behrens, Jr.
(74) *Attorney, Agent, or Firm* — Masuvalley and Partners; Peter Martinez (57) ABSTRACT

The present invention is a method that enables continuous injection molding of a thermosetting resin composition and reuse of an unnecessary part produced during the molding. The method includes injecting a thermosetting resin composition into a mold while a curing reaction of the resin composition is incomplete. The thermosetting resin composition is then cooled in the mold until becoming semi-cured and removed as a semi-cured product from the mold. The semi-cured product is separated from the unnecessary part and separately heated to progress a thermosetting reaction of the thermosetting resin composition. The unnecessary part may be used as a reworked raw material by regrinding the unnecessary part and mixing it with a fresh thermosetting resin composition. Then, a resultant mixture is used to perform a new injection molding.

9 Claims, 3 Drawing Sheets

(51) Int. Cl.
  C08K 3/013 (2018.01)
  B29C 45/72 (2006.01)
  C08K 3/40 (2006.01)
  B29C 45/00 (2006.01)
  B29C 45/18 (2006.01)
  B29K 101/10 (2006.01)
  C08K 3/22 (2006.01)
  C08K 3/26 (2006.01)

(52) U.S. Cl.
  CPC ............... B29C 2045/0058 (2013.01); B29C 2045/1833 (2013.01); B29C 2793/009 (2013.01); B29K 2101/10 (2013.01); C08K 3/013 (2018.01); C08K 3/40 (2013.01); C08K 2003/2227 (2013.01); C08K 2003/2237 (2013.01); C08K 2003/265 (2013.01); C08K 2201/01 (2013.01)

(58) Field of Classification Search
  CPC ... B29C 66/73; B29C 66/739; B29C 66/7394; B29C 66/73941; B29C 2793/009; C08K 3/013; C08K 3/36; C08K 3/40; C08K 2003/2227; C08K 2003/2237; C08K 2003/265; C08K 2201/01; B29B 17/00; B29K 2101/10
  USPC ........................................................ 264/336
  See application file for complete search history.

(56) References Cited

U.S. PATENT DOCUMENTS

| | | | | |
|---|---|---|---|---|
| 5,885,514 A * | 3/1999 | Tensor | ................ | B29C 35/0888 264/478 |
| 8,268,956 B2 * | 9/2012 | Buhler | ................... | B29C 33/40 528/310 |
| 10,384,382 B2 * | 8/2019 | Franssen | ............ | B29C 45/0053 |
| 2012/0277900 A1 * | 11/2012 | Catoen | ................... | B29C 45/73 700/202 |
| 2016/0017142 A1 * | 1/2016 | Imada | ...................... | C08L 69/00 523/451 |
| 2017/0218192 A1 * | 8/2017 | Groote | ....................... | C08J 3/24 |

FOREIGN PATENT DOCUMENTS

| | | | | | |
|---|---|---|---|---|---|
| JP | 2002/240094 | | * | 2/2001 | ............ B29C 45/17 |
| JP | 2002-240094 | A | | 8/2002 | |
| JP | 2002240094 | A | * | 8/2002 | |
| JP | 2004-130730 | A | | 4/2004 | |
| JP | 2006-199812 | | * | 1/2005 | ............ C08G 59/68 |
| JP | 200619912 | A | * | 1/2005 | |
| JP | 2005-324483 | A | | 11/2005 | |
| JP | 2006-199812 | A | | 8/2006 | |
| JP | 2006-233141 | A | | 9/2006 | |
| JP | 2008/165039 | | * | 12/2006 | ............ B29C 45/17 |
| JP | 2008-165039 | A | | 7/2008 | |
| JP | 2008165039 | A | * | 7/2008 | |
| JP | 2014/173063 | | * | 12/2013 | ............ B29C 45/14 |
| JP | 2014-173063 | A | | 9/2014 | |
| JP | 2014173063 | A | * | 9/2014 | |
| TW | 200718478 | A | | 5/2007 | |
| WO | WO-9622181 | A1 | * | 7/1996 | ............ B29C 45/73 |

OTHER PUBLICATIONS

Machine Translation for Fujiura Patent JP2014-173063, Generated on Jun. 11, 2019 https://patents.google.com/patent/JP2014173063A/en?oq=JP2014173063 (Year: 2013).*

Machine Translation for Fuji Patent JP2008-165039, Generated on Jun. 20, 2019 https://patents.google.com/patent/JP2008165039A/en?oq=JP2008165039 (Year: 2006).*

Machine Translation for Murakami Patent JP2006-199812, Generated on Jun. 20, 2019 https://patents.google.com/patent/JP2006199812A/en?oq=JP2006199812 (Year: 2005).*

Fujiura, Hiroshi. JP-2014/173,063 (Hiroshi) Dec. 2013 (online machine translation), [Retrieved on Nov. 14, 2019]. Retrieved from: Espacenet (Year: 2013).*

Yuichi Fujii . JP-2008/165,039 (Fujii) Dec. 2006 (online machine translation), [Retrieved on Nov. 14, 2019]. Retrieved from: Espacenet (Year: 2006).*

Hirobumi Watanabe . JP-2014/173,063 (Watanabe ) Feb. 2001 (online machine translation), [Retrieved on Nov. 14, 2019]. Retrieved from: Espacenet (Year: 2001).*

Atsushi Murakami. JP-2006-199812 (Murakami) Jan. 2005 (online machine translation), [Retrieved on Nov. 14, 2019]. Retrieved from: Espacenet (Year: 2005).*

"Injection Moulding." Wikipedia, Wikimedia Foundation, Oct. 5, 2014, web.archive.org/web/20141005224426/en.wikipedia.org/wiki/Injection_moulding. (Year: 2014).*

ISA/JP, International Search Report dated Jul. 26, 2016 in International Application No. PCT/JP2016/062237, total 4 pages with translation.

JPO, Notification of Reasons for Refusal dated Jul. 24, 2018 in Japanese Patent Application No. 2017-514110, total 7 pages with English translation.

KIPO, Korean Office Action dated Dec. 1, 2021 in Korean Application No. 10-2017-7030217, 14 pages with translation.

KIPO, Korean Office Action (with English translation) dated Aug. 5, 2021 in Korean Application No. 10-2017-7030217, 13 pages.

* cited by examiner

METHOD FOR INJECTION-MOLDING THERMOSETTING RESIN COMPOSITION

RELATED APPLICATIONS

The present invention is the U.S. National Phase of and claims priority to International Patent Application No. PCT/JP2016/062237 filed Apr. 18, 2016 entitled Method for injection-molding thermosetting resin composition, which claims priority to Japanese Patent Application No. JP 2015-087029 filed Apr. 21, 2015, all of which are incorporated herein by reference in their entireties.

TECHNICAL FIELD

The present invention relates to methods for injection-molding a thermosetting resin composition.

BACKGROUND ART

Injection molding of a thermoplastic resin is generally continuously performed and therefore known as a high-productivity method. However, when a thermosetting resin continues to be injected using an injection molding machine for thermoplastic resins, the temperature of the entire injection molding machine, including members surrounding a mold, will rise to excess the cure onset temperature of the thermosetting resin and thus cure the resin, for which reason the thermosetting resin is difficult to continuously mold.

Furthermore, when a molded article is separated after injection molding is performed, an unnecessary part (so-called sprue runner) that will not be an article is produced. This unnecessary part is derived from a resin composition solidified in a flow channel of a mold located between an inlet for the resin composition and a cavity for an article. When the resin composition is a thermoplastic resin composition, this unnecessary part can be reused after molding by separating it from a molded article and mixing it with a fresh thermoplastic resin composition.

On the other hand, when the resin composition is a thermosetting resin composition, the unnecessary part is disposed of without being reused since the resin composition is cured during molding. However, it is a waste to dispose of a resin composition of the unnecessary part as it is. Furthermore, when the article has a small size, the unnecessary part becomes relatively large. Therefore, mixing of an expensive filler into the resin results in a large amount of the filler being wasted. This is a factor that raises the production costs of some small-sized products.

SUMMARY OF INVENTION

Technical Problem

To cope with the above situation, the present invention has an object of providing a method that enables continuous injection molding of a thermosetting resin composition and reuse of an unnecessary part produced during the molding.

Solution to Problem

In one aspect of the present invention, first, a thermosetting resin composition is injected into a mold while a curing reaction of the resin composition is incomplete. Next, the thermosetting resin composition is cooled in the mold until becoming semi-cured. Next, the thermosetting resin composition is removed in a semi-cured state from the mold. Next, the thermosetting resin composition is separated into a part to be an article and an unnecessary part. Next, the part to be an article is separately heated to progress a thermosetting reaction of the thermosetting resin. The unnecessary part is used as a raw material for a new injection molding. In a preferred aspect, first, the unnecessary part is ground. Next, a resultant ground product is mixed with a fresh thermosetting resin composition. Then, a resultant mixture is used to perform a new injection molding.

Advantageous Effects of Invention

The present invention enables continuous injection molding of a thermosetting resin composition and reuse of an unnecessary part produced during the molding. Thus, the production cost for the thermosetting resin composition can be reduced.

DESCRIPTION OF EMBODIMENTS

Method for Injection-Molding Thermosetting Resin Composition

Figure 2:
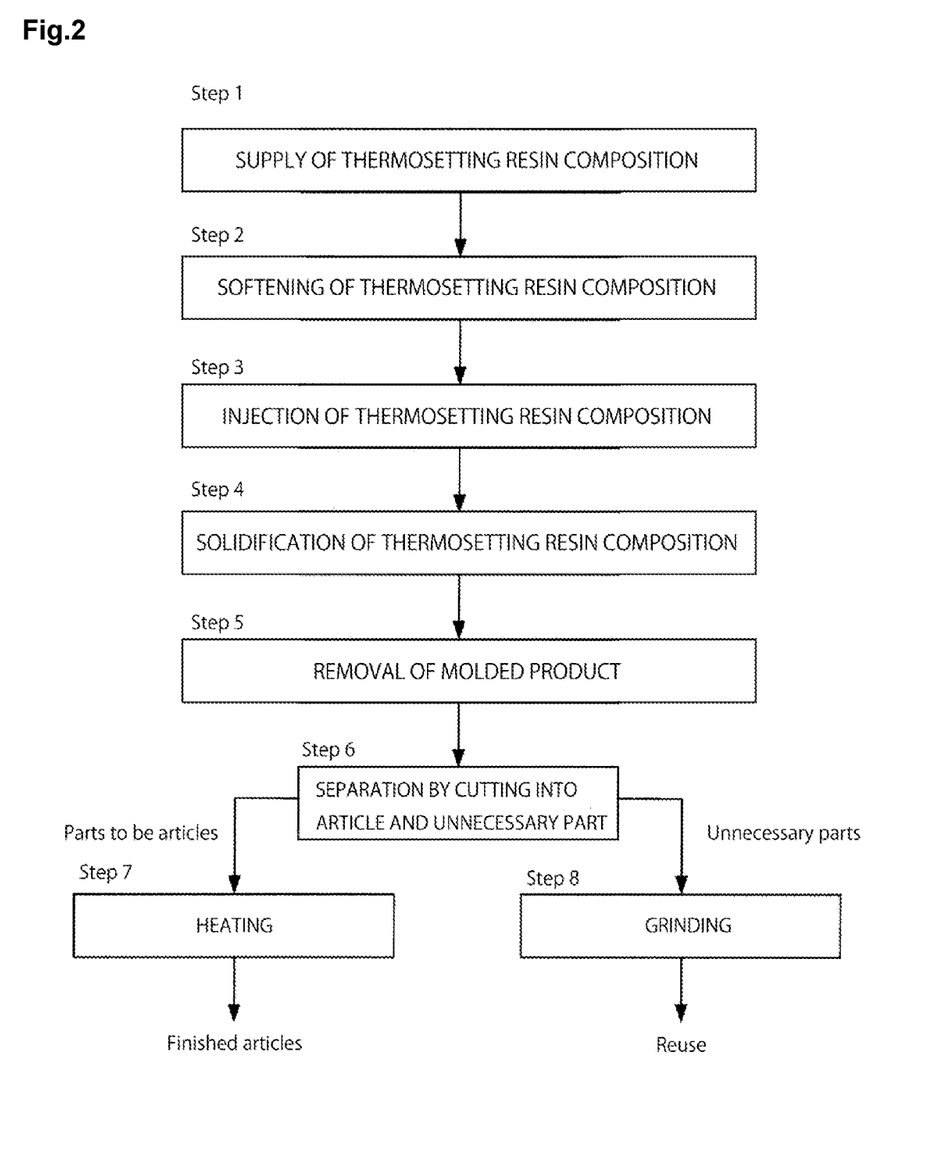
FIG. 2 is a flow chart illustrating the method for injection-molding a thermosetting resin composition according to this embodiment.

FIG. 2 is a flow chart showing steps in a method for injection-molding a thermosetting resin composition according to this embodiment. As shown in this figure, the method for injection-molding a thermosetting resin composition according to this embodiment is composed of the following steps.

Step 1: supply of thermosetting resin composition, in which a thermosetting resin composition to be a raw material is supplied into a cylinder of an injection molding machine.

Step 2: softening of thermosetting resin composition, in which the thermosetting resin composition is softened or melted in the cylinder.

Step 3: injection of thermosetting resin composition, in which the thermosetting resin composition is injected from the cylinder into a mold.

Step 4: semi-curing of thermosetting resin composition, in which the thermosetting resin composition is cooled in the mold to become semi-cured, thus converting the resin composition to a B-stage state.

Step 5: removal of molded product, in which the molded thermosetting resin composition is removed from the mold.

Step 6: separation by cutting into part to be article and unnecessary part, in which the molded thermosetting resin composition is separated by cutting into a part to be an article and an unnecessary part.

Step 7: heating, in which the part to be an article is heated to progress a thermosetting reaction of the thermosetting resin composition. Thus, an article is obtained.

Step 8: grinding, in which the unnecessary part is finely ground. Then, the obtained ground product is mixed with a fresh thermosetting resin composition and this mixture is served for a new injection molding.

Figure 3:
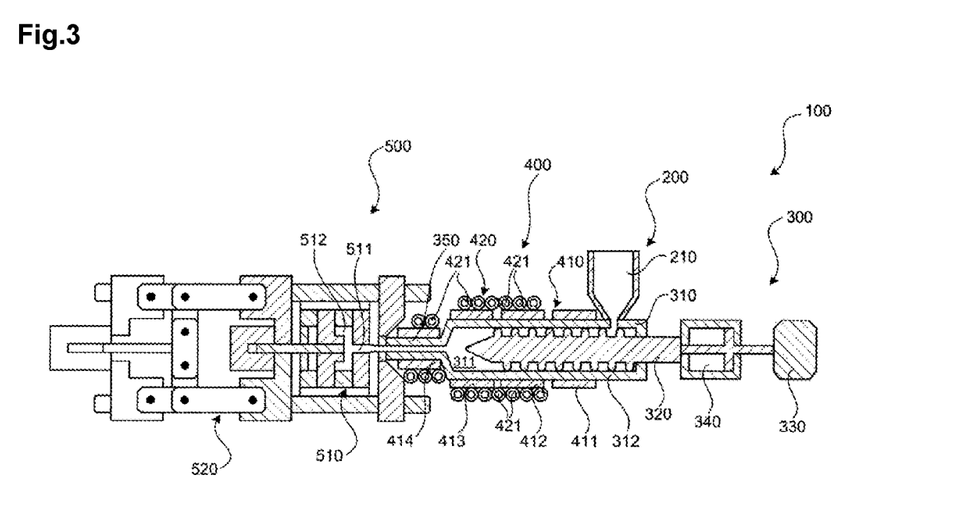
FIG. 3 is a schematic cross-sectional view showing an embodiment of an injection molding machine for use in the method for injection-molding a thermosetting resin composition according to this embodiment.

The injection molding method according to this embodiment will be described in more detail with reference to FIGS. 3 and 1. An injection molding machine 100 shown in FIG. 3 is suitably used for injection molding of thermosetting resin compositions. As shown in this figure, the injection molding machine 100 includes a hopper 210, a cylinder 310, and a mold 510. First, a thermosetting resin composition to be a raw material is supplied from the hopper 210 into the cylinder 310 (step 1). Next, this thermosetting resin composition is softened or melted in the cylinder 310 (step 2). Thereafter, the softened or molted thermosetting resin composition is injected from the cylinder 310 into the mold 510 (step 3). Then, the injected resin composition is cooled in the mold 510 to convert it to a semi-cured (B-stage) state (step 4).

Thereafter, the semi-cured thermosetting resin composition is removed from the mold (step 5). As shown in the upper stage in FIG. 1, the removed molded product is present in a state where a plurality of parts to be articles and a plurality of unnecessary parts are connected together. Therefore, as shown in the middle stage of FIG. 1, the molded product is separated by cutting into parts to be articles and unnecessary parts (step 6). Thereafter, as shown in the left side of the lower stage of FIG. 1, the parts to be articles are heated to progress the thermosetting reaction, thus obtaining end articles (step 7). Furthermore, as shown in the right side of the lower stage of FIG. 1, the unnecessary parts are ground and reused as a new raw material (step 8).

Since, as just described, the unnecessary parts are used as a raw material for a new injection molding in this embodiment, the production of wastes can be reduced, which is economical. Particularly in the case of mixing an expensive filler into the resin, the increase in production cost can be significantly reduced. Hereinafter, a detailed description will be given of the individual steps.

Step 1: Supply of Thermosetting Resin Composition

Referring back to FIG. 3, the thermosetting resin composition to be a raw material is loaded into the hopper 210. Then, the thermosetting resin composition in the hopper 210 is supplied into the cylinder 310. Here, the thermosetting resin composition is composed of a thermosetting resin and a curing agent. The thermosetting resin refers to a resin having the nature of, when heated, polymerizing with the curing agent to form a polymer network and become cured. Examples of the thermosetting resin include phenolic resins, epoxy resins, melamine resins, urea resins, polyester resins, alkyd resins, polyurethanes, and polyimides. Among them, epoxy resins are particularly suitably used in the present invention. Examples of the curing agent include phenol novolacs and cresol novolacs. The inventors have found that suitable molding can also be performed using a material in which a rework of a semi-cured thermosetting resin composition made of any of the above thermosetting resins and any of the above curing agents is mixed as a raw material into a fresh thermosetting resin composition.

Furthermore, a filler can be mixed into the thermosetting resin composition depending on the intended use. Thus, the physical properties required for the resin composition can be improved or optimized. Examples of the filler include inorganic fillers and organic fillers. Examples of the inorganic fillers include glass, silica, sand, clay, cristobalite, wollastonite, aluminum hydroxide, titanium oxide, talc, calcium carbonate, and magnetic powder. Materials described in International Publication No. WO 2015/008842, and so on can be used as the magnetic powder. Examples of magnetic particles in the magnetic powder include ferromagnetic oxides, such as magnetite, γ-iron oxide, manganese ferrite, cobalt ferrite, their composite ferrites with zinc or nickel, and barium ferrite, ferromagnetic metals, such as iron, cobalt, and rare earth metals, and metal nitrides.

Examples of the organic fillers include acrylic ester polymers, methacrylic ester polymers, and urethane polymers. The average particle size of the filler is not particularly limited but, for example, can be 10 nm to 100 μm. According to the present invention, since the unnecessary part is reused as a raw material also when the filler is expensive, the filler in the unnecessary part is also reused as a raw material. As a result, the production cost for the article can be reduced.

Step 2: Softening of Thermosetting Resin Composition

The thermosetting resin composition in the cylinder 310 is softened or melted in the cylinder 310. As shown in FIG. 3, the injection molding machine 100 includes a heater 410 and a cooler 420. The thermosetting resin composition is softened or melted by the application of heat from the heater 410.

As shown in FIG. 3, the cylinder 310 includes a body 312 and a nozzle 350. To soften or melt the thermosetting resin composition, it is necessary to control the thermosetting resin composition within a predetermined temperature range by keeping preset temperatures of the cylinder 310 and the nozzle 350 within narrow temperature ranges. More specifically, the temperature of the body 312 is preferably set to be 20 to 30° C. lower than the curing reaction onset temperature of the thermosetting resin composition. Furthermore, the temperature of the nozzle 350 is preferably set to be 10 to 20° C. lower than the curing reaction onset temperature of the thermosetting resin composition. Moreover, the temperature of the nozzle 350 is preferably set to be 10 to 20° C. higher than the preset temperature of the body 312. The inventors have found that when the body 312 and the nozzle 350 are set within such temperature ranges, suitable injection into the mold 510 can be achieved. More specifically, the thermosetting resin composition needs to be kept, in the cylinder 310, at a temperature higher than the softening temperature of the thermosetting resin composition and lower than the cure temperature thereof. In the injection molding machine 100 of this embodiment shown in FIG. 3, the softened or melted resin composition is cooled by the cooler 420, so that the temperature of the resin composition is suitably prevented from rising beyond the preset temperature. As thus far described, the injection molding machine 100 according to this embodiment can accurately control the thermosetting resin composition in the cylinder 310 within the predetermined temperature range. This injection molding machine 100 will be hereinafter described in detail. It is needless to say that the present invention can be implemented by injection molding machines other than the injection molding machine 100 according to this embodiment.

Step 3: Injection of Thermosetting Resin Composition

After step 2, the thermosetting resin composition softened or melted in the cylinder 310 is injected from the cylinder 310 into the mold 510.

Step 4: Semi-Curing of Thermosetting Resin Composition

After step 3, the thermosetting resin composition is cooled in the mold and thus formed into a molded product in a semi-cured state, i.e., a so-called B-stage state. Herein, the B-stage state refers to a state where the reaction of a resin material progresses to some degree to convert the resin material to a polymeric state, but the curing reaction is not completed and plasticity is still maintained.

Step 5: Removal of Molded Product

The thermosetting resin composition is removed in a semi-cured state from the mold 510. In this step, the thermosetting resin composition is removed from the mold 510 after the temperature of the thermosetting resin composition reaches a temperature preferably 50° C. or more lower, more preferably 75 to 100° C. lower, than the cure temperature. The inventors have confirmed that when the thermosetting resin composition is removed from the mold 510 after being cooled to such a low temperature, the mold release of the thermosetting resin composition is improved.

Step 6: Separation by Cutting into Article and Unnecessary Part

Figure 1:
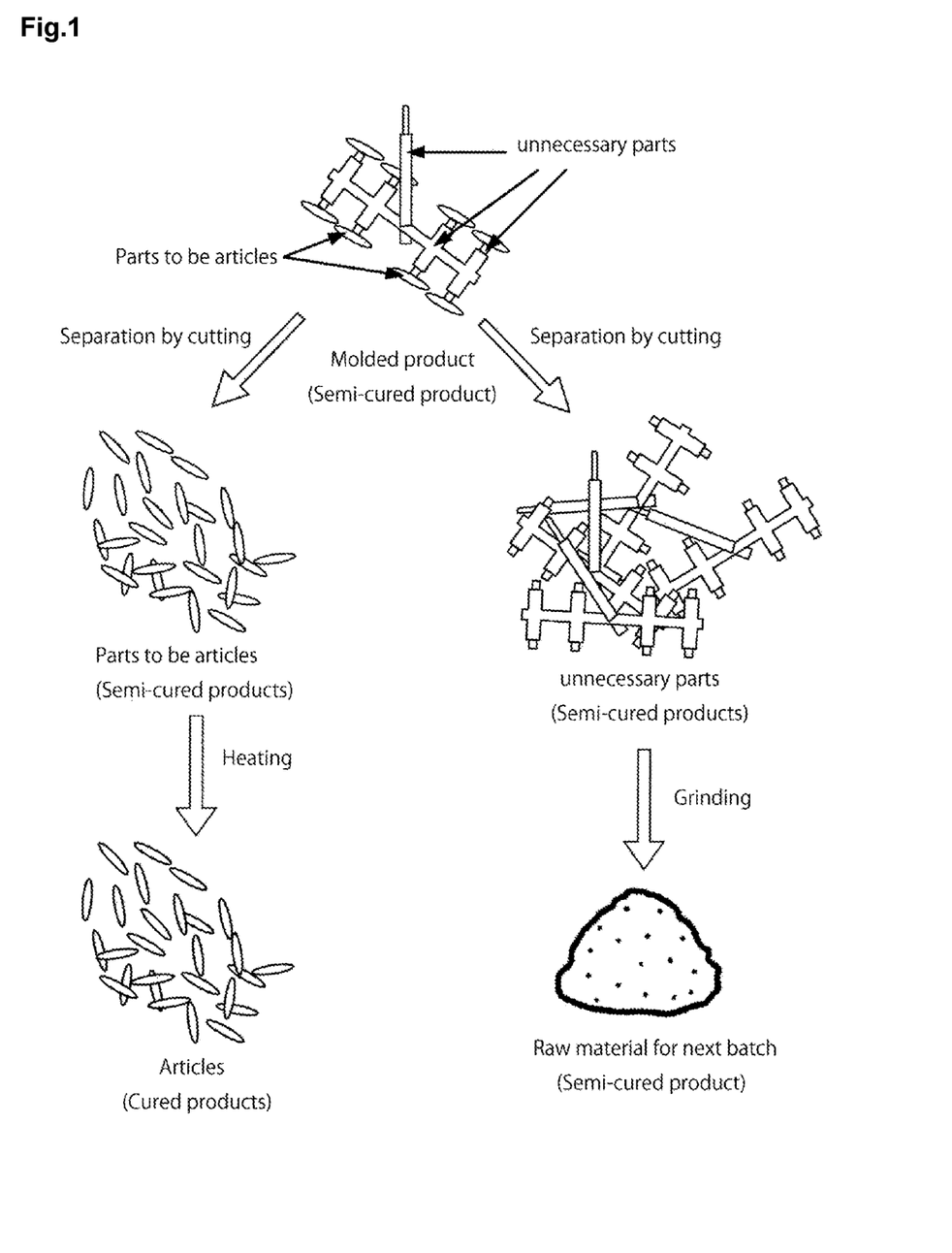
FIG. 1 is a schematic diagram for illustrating a method for injection-molding a thermosetting resin composition according to this embodiment.

As shown in the upper stage of FIG. 1, the molded product removed from the mold 510 is a semi-cured thermosetting resin composition. This molded product includes parts to be articles and unnecessary parts. The unnecessary part is a part commonly called a sprue runner and is derived from a resin solidified in a flow channel of the mold 510 located between an inlet for the resin and a cavity for an article. In this step, the molded product is separated by cutting into parts to be articles and unnecessary parts. This separation by cutting is implemented in an ordinary method using a heat nipper or the like.

Step 7: Heating

As shown in the left side of the middle stage of FIG. 1, the separated parts to be articles are heated. Thus, as shown in the left side of the lower stage of FIG. 1, the thermosetting resin composition progresses the thermosetting reaction to become cured products. As a result, articles are obtained. The thermosetting resin composition is heated preferably at a temperature higher, more preferably 15 to 40° C. higher, than the cure temperature of the thermosetting resin composition. The heating is implemented in an ordinary method using an oven or the like.

Step 8: Grinding

As shown in the right side of the middle stage of FIG. 1, the separated unnecessary parts are ground. The grinding is implemented in an ordinary method using a cutter mixer or the like. Thereafter, as shown in the right side of the lower stage of FIG. 1, the ground unnecessary parts are used as a reworked raw material for a new injection molding. More specifically, the ground product is mixed with a fresh thermosetting resin composition, this mixture is loaded into the hopper 210 of the injection molding machine 100, and injection molding is newly performed. The mixture ratio of unnecessary parts, i.e., a reworked material, to a fresh thermosetting resin composition is, in weight ratio (unnecessary parts to fresh thermosetting resin), preferably about 0.1:100 to about 50:100 and more preferably about 1:100 to about 20:100. When the unnecessary parts are reusable without being ground, they may be used as a reworked raw material without being ground.

Injection Molding Machine 100

Hereinafter, a description will be given of an injection molding machine suitably used for injection-molding the thermosetting resin composition described above. FIG. 3 is a schematic cross-sectional view showing one embodiment of an injection molding machine according to the present invention. As shown in this figure, an injection molding machine 100 includes a resin composition supply section 200, an injecting section 300, a temperature control section 400, and a mold installation section 500. The thermosetting resin composition to be a raw material is supplied from the resin composition supply section 200 to the injecting section 300. The thermosetting resin composition in the injecting section 300 is heated by the temperature control section 400 to become softened or melted. The softened or melted resin composition is injected from the injecting section 300 into a mold 510 provided in the mold installation section 500. The injected thermosetting resin composition becomes semi-cured in the mold 510 by cooling. Thereafter, the semi-cured thermosetting resin composition is removed from the mold 510.

Resin Composition Supply Section 200

The supply section 200 for the thermosetting resin composition includes a hopper 210. The hopper 210 can accumulate the thermosetting resin composition to be a raw material and can supply the thermosetting resin composition to be a raw material to a cylinder 310 included in the injecting section 300.

Injecting Section 300

The injecting section 300 includes the cylinder 310, a screw 320, a screw rotating device 330, a screw moving device 340, and a nozzle 350. The cylinder 310 is a cylindrical member and includes an internal space 311 into which the thermosetting resin composition is supplied. The cylinder 310 is located downstream of the hopper 210. More specifically, the hopper 210 is connected to a lateral surface of the cylinder 310 close to the proximal end of the cylinder 310. The nozzle 350 is formed on the distal end of the cylinder 310. The screw 320 is inserted and mounted in the internal space 311 of the cylinder 310. The proximal end of this screw 320 protrudes from the cylinder 310. Then, the proximal end of the screw 320 is connected to the screw rotating device 330 and the screw moving device 340. The screw 320 is rotated by the screw rotating device 330. Furthermore, the screw 320 can be moved in the longitudinal direction of the cylinder 310 by the screw moving device 340.

Temperature Control Section 400

The temperature control section 400 is provided near the periphery of the cylinder 310. The temperature control section 400 can control the temperature of the cylinder 310 and in turn the resin composition in the internal space 311 of the cylinder 310. This temperature control section 400 includes a heater 410 and a cooler 420.

The heater 410 can heat the cylinder 310. This heater 410 includes an upstream heater 411, a midstream heater 412, a downstream heater 413, and a nozzle heater 414. The upstream heater 411, the midstream heater 412, and the downstream heater 413 are disposed to surround the cylinder 310. More specifically, the upstream heater 411, the midstream heater 412, and the downstream heater 413 have a structure in which sheet-like electric heaters are wrapped around the outer periphery of the cylinder 310. Therefore, the upstream heater 411, the midstream heater 412, and the downstream heater 413 are in contact with the outer peripheral surface of the cylinder 310. Likewise, the nozzle heater 414 is disposed to surround the nozzle 350. More specifically, the nozzle heater 414 has a structure in which a sheet-like electric heater is wrapped around the outer periphery of the nozzle 350. Therefore, the nozzle heater 414 is in contact with the outer peripheral surface of the nozzle 350. The upstream heater 411 is placed close to the proximal end of the cylinder 310, more specifically, near the downstream end of the hopper 210. The downstream heater 413 is placed close to the distal end of the cylinder 310, more specifically, near the upstream end of the nozzle 350. The midstream heater 412 is placed near the middle portion of the cylinder 310, more specifically, between the upstream heater 411 and the downstream heater 413. These upstream heater 411, midstream heater 412, downstream heater 413, and nozzle heater 414 can be independently set in terms of heating temperature.

The cooler 420 is provided in proximity to the heater 410. More specifically, the cooler 420 is placed to surround the heater 410. The cooler 420 includes a cooling pipe 421. This cooling pipe 421 is wound like a coil on the outer peripheries of the nozzle heater 414, the downstream heater 413, and the midstream heater 412. Therefore, the cooling pipe 421 is in contact with the outer peripheral surfaces of the nozzle heater 414, the downstream heater 413, and the midstream heater 412. A coolant, specifically, water is allowed to flow through the cooling pipe 421.

As just described, in the injection molding machine 100, the heater 410 is placed to surround the outer peripheral surface of the cylinder 310. Furthermore, the cooler 420 is placed to surround the outer peripheral surface of the heater 410. In other words, in the injection molding machine 100, the inner peripheral surface of the heater 410 is in contact with the outer peripheral surface of the cylinder 310 and the outer peripheral surface of the heater 410 is in contact with the cooler 420. With such a structure, the temperature of resin in the internal space 311 can be accurately controlled over a wide area from an upstream portion to a downstream portion of the cylinder 310.

Mold Installation Section 500

In the mold installation section 500, a mold 510 and an opening and closing device 520 are placed. The mold 510 is connected to the nozzle 350. This mold 510 is internally provided with a flow channel 511 through which the resin composition can flow, and a filling portion 512 to be filled with the resin composition. The flow channel 511 communicates with the exit of the nozzle 350. The filling portion 512 has a shape corresponding to the shape of an article. The opening and closing device 520 can open and close the mold 510.

Operation of Injection Molding Machine 100

In molding the resin composition, first, the heater 410 is turned on. In conjunction with this, a coolant is supplied into the cooler 420. The cooler 420 has the effect of cooling the cylinder 310, but the temperature of the cylinder 310 increases by the effect of the heater 410. When the temperature of the cylinder 310 reaches a first preset temperature, the heater 410 is turned off. Thus, the temperature of the cylinder 310 starts to decrease by the effect of the cooler 420. Then, when the temperature of the cylinder 310 decreases to a second preset temperature, the heater 410 is turned on again. In this manner, the heater 410 is repeatedly turned on and off. As a result, the temperature of the cylinder 310 is kept within a narrow range between the first preset temperature and the second preset temperature.

In conjunction with the above, the solid-state thermosetting resin composition is supplied through the hopper 210 into the internal space 311 of the cylinder 310. The thermosetting resin composition is ground and conveyed in a downstream direction of the internal space 311 by the screw 320. Furthermore, since the cylinder 310 is being heated, the thermosetting resin composition is softened or melted while moving downstream in the internal space 311. Then, the softened or melted resin composition is extruded by the screw 320 and injected through the nozzle 350 into the mold 510. The resin having entered the mold 510 passes through the flow channel 511 and enters the filling portion 512. As a result, the filling portion 512 is filled with the injected thermosetting resin composition. Thereafter, the thermosetting resin composition is cooled, thus obtaining a semi-cured molded product. Note that the cooling herein includes natural cooling. According to the present invention, since the thermosetting resin is injection-molded while its temperature is controlled according to the cure temperature of the thermosetting resin, the thermosetting resin can be held against being fully cured and held semi-cured. Furthermore, when magnetic powder is used as a filler, the temperature control is performed in consideration of the decomposition temperature of a dispersant, such as oleic acid, coated on the surface of the magnetic powder to restrain the burning of the dispersant, so that the occurrence of appearance defects due to gasification of the dispersant can be prevented. With the thermosetting resin composition semi-cured, the mold 510 is opened and the semi-cured resin composition is demolded. Thereafter, the thermosetting resin composition solidified in the flow channel 511 and the thermosetting resin composition solidified in the filling portion 512 are separated from each other by cutting, so that an article is obtained. The article is heated in an oven or the like and thus cured.

Advantages of Injection Molding Machine 100

Figure 4:
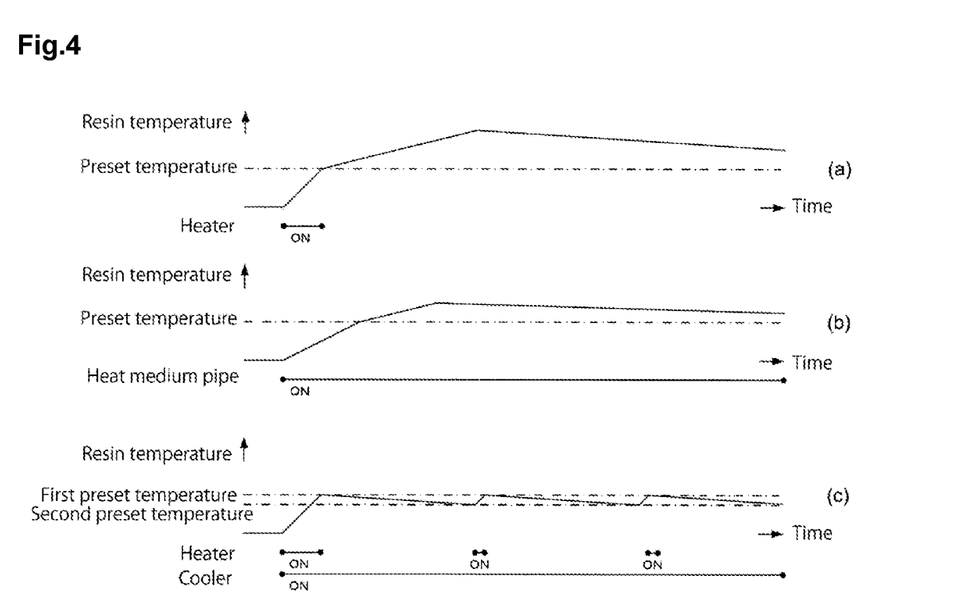
FIG. 4 is a graph showing temperature changes of a resin composition when cylinders in various types of injection molding machines were controlled in temperature.

FIG. 4 is a graph showing temperature changes of in-cylinder resin compositions when cylinders in various types of injection molding machines were controlled in temperature. FIG. 4(*a*) shows temperature changes of a resin composition in a general injection molding machine for thermoplastic resin compositions, i.e., an injection molding machine including only a heater. In such an injection molding machine, when the heater is turned on, the resin temperature rapidly rises and the resin composition produces heat due to shear heating or the like. Even after the heater is turned off, the resin temperature continues to rise. Therefore, the actual temperature of the resin composition can reach a much higher temperature than the preset temperature. According to the inventors' observation, the actual temperature of the resin composition often becomes 20 to 30° C. higher than the preset temperature.

FIG. 4(*b*) shows temperature changes of a resin composition in such an injection molding machine as described in Patent Literature 1. Specifically, the figure shows temperature changes of a resin composition in the cylinder when the cylinder was controlled in temperature by a heat medium pipe. In this injection molding machine, the temperature rise of the resin composition can be reduced as compared to the general injection molding machine for thermoplastic resin compositions. However, the injection molding machine cannot achieve a temperature control accurate enough to mold a thermosetting resin composition. Therefore, in order to mold a thermosetting resin composition, the temperature of the thermosetting resin composition needs to be controlled with higher accuracy.

Patent Literature 1: Japanese Registered Utility Model No. 3008951

FIG. 4(*c*) shows temperature changes of an in-cylinder resin composition when the cylinder was controlled in temperature by the injection molding machine 100. As shown in this figure, when the heater 410 is turned on, the temperature of the resin composition rapidly rises. Thereafter, when the heater 410 is turned off, the resin composition is cooled by the cooler 420, so that the temperature of the resin composition is prevented from further rising. Then, the resin temperature gradually decreases. When the temperature of the resin composition reaches the second preset temperature, the heater 410 is turned on again. Thus, the temperature of the resin composition rapidly rises to the first preset temperature again. Thereafter, the heater 410 is turned off again. As a result, the temperature of the resin composition gradually decreases and reaches the second preset temperature again. In this manner, in the injection molding machine 100, the temperature of the resin composition is kept within a narrow range between the first preset temperature and the second preset temperature. Therefore, the temperature constancy is increased and the accuracy in temperature control is also increased. As a result, the injection molding machine 100 can also mold thermosetting resin compositions.

As shown in FIG. 4(c), in heating the resin composition, both the heater 410 and the cooler 420 are preferably activated concurrently. The inventors have confirmed that when the cooler 420 is continuously activated even while the resin composition is heated, the range of temperature variations of the resin composition becomes smaller. Furthermore, in allowing a coolant to flow through the cooling pipe 421, the coolant is preferably allowed to flow from the downstream side toward the upstream side of the cylinder 310. Moreover, the temperature of the coolant flowing through the cooling pipe 421 is preferably set at about 0 to 50° C. and more preferably set at about 0 to 15° C. Furthermore, in molding a thermosetting resin composition, the coolant temperature is preferably set to be about 50 to 120° C. lower and more preferably about 80 to 100° C. lower than the cure temperature of the resin composition. The inventors have found that when cold water (water cooled to a lower temperature than room temperature) is used as the coolant, the molding of the thermosetting resin composition can be suitably performed.

EXAMPLES (Constituents of Thermosetting Resin Composition)

Resin: epoxy resin ("jER1004" manufactured by Mitsubishi Chemical Corporation and having a cure onset temperature of 115° C.)

Curing agent: phenol novolac ("TD2106" manufactured by DIC Corporation)

Inorganic filler (A) Silica: "Sylysia 350" manufactured by Fuji Silysia Chemical Ltd. and having an average particle size of 3.9 μm (B) Magnetic powder: magnetic powder prepared by removing a dispersant, in a method described below, from a magnetic fluid "EXP. 12038" manufactured by Ferrotec Corporation (magnetic particles: magnetite having an average primary particle size of 15 nm, dispersant: sodium oleate)

Example 1 (Examples 1-1 to 1-7 and Comparative Examples 1-1 to 1-6)

An amount of 100 parts by mass of the above resin and 10 parts by mass of the above curing agent were mixed using a blender mixer. Thereafter, 100 parts by mass of (A) silica was added as an inorganic filler and further mixed using a Buss Ko-Kneader, thus obtaining a thermosetting resin composition. The obtained thermosetting resin composition was put into the hopper of the injection molding machine shown in FIG. 3, the cylinder body and the nozzle were set at various temperatures as shown in Table 1, and respective injection moldings were performed. Table 1 shows mold temperatures (actual measured values) at the start and end of molding of each of examples and comparative examples. The mold temperature was controlled using a water-cooled temperature controller.

TABLE 1

|  | Preset Temperature of Cylinder Body (° C.) | | | Preset Temperature of Nozzle (° C.) | Mold Temperature (° C.) (at the start of molding) | Mold Temperature (° C.) (at the end of molding) |
| --- | --- | --- | --- | --- | --- | --- |
|  | Upstream Portion | Midstream Portion | Downstream Portion |  |  |  |
| Comp. Ex. 1-1, 2-1 | 90 | 100 | 90 | 130 | 12 | 14 |
| Comp. Ex. 1-2, 2-2 | 90 | 105 | 90 | 135 | 12 | 14 |
| Comp. Ex. 1-3, 2-3 | 90 | 105 | 95 | 135 | 12 | 14 |
| Comp. Ex. 1-4, 2-4 | 90 | 105 | 95 | 135 | 12 | 14 |
| Comp. Ex. 1-5, 2-5 | 90 | 105 | 125 | 140 | 12 | 14 |
| Comp. Ex. 1-6, 2-6 | 90 | 105 | 100 | 135 | 12 | 14 |
| Example 1-1, 2-1 | 115 | 115 | 100 | 110 | 12 | 14 |
| Example 1-2, 2-2 | 90 | 105 | 95 | 115 | 12 | 40 |
| Example 1-3, 2-3 | 90 | 105 | 95 | 115 | 12 | 20 |
| Example 1-4, 2-4 | 90 | 105 | 6 | 115 | 24 | 24 |
| Example 1-5, 2-5 | 0 | 0 | 0 | 115 | 24 | 24 |
| Example 1-6, 2-6 | 90 | 90 | 95 | 105 | 20 | 20 |
| Example 1-7, 2-7 | 90 | 90 | 90 | 105 | 23 | 23 |

Table 2 shows results of evaluation of how many times the thermosetting resin composition could be continuously injected at the different preset temperatures (Examples 1-1 to 1-7 and Comparative Examples 1-1 to 1-6), wherein the evaluation was made in the following manner. Examples 1-1 to 1-7 where continuous injection molding was successful were evaluated in terms of molded states of resultant molded products visually as described below. The results are also shown in Table 2.

TABLE 2

|  | Continuous Injection | Non-defective Rate |
|---|---|---|
| Comp. Ex. 1-1 | unsuccessful continuous injection | — |
| Comp. Ex. 1-2 | unsuccessful continuous injection | — |
| Comp. Ex. 1-3 | unsuccessful continuous injection | — |
| Comp. Ex. 1-4 | unsuccessful continuous injection | — |
| Comp. Ex. 1-5 | unsuccessful continuous injection | — |
| Comp. Ex. 1-6 | unsuccessful continuous injection | — |
| Example1-1 | successful continuous injection | △ |
| Example1-2 | successful continuous injection | △ |
| Example1-3 | successful continuous injection | ○ |
| Example1-4 | successful continuous injection | △ |
| Example1-5 | successful continuous injection | △ |
| Example1-6 | highly successful continuous injection | ○ |
| Example1-7 | highly successful continuous injection | ◎ |

TABLE 3

|  | Continuous Injection | Non-defective Rate |
|---|---|---|
| Comp. Ex. 2-1 | unsuccessful continuous injection | — |
| Comp. Ex. 2-2 | unsuccessful continuous injection | — |
| Comp. Ex. 2-3 | unsuccessful continuous injection | — |
| Comp. Ex. 2-4 | unsuccessful continuous injection | — |
| Comp. Ex. 2-5 | unsuccessful continuous injection | — |
| Comp. Ex. 2-6 | unsuccessful continuous injection | — |
| Example2-1 | successful continuous injection | △ |
| Example2-2 | successful continuous injection | △ |
| Example2-3 | successful continuous injection | ○ |
| Example2-4 | successful continuous injection | △ |
| Example2-5 | successful continuous injection | △ |
| Example2-6 | highly successful continuous injection | ○ |
| Example2-7 | highly successful continuous injection | ◎ |

(Number of Continuous Injection Moldings)

Injection molding was continuously performed under the temperature conditions described in Table 1 and how many times injection molding could be achieved until clogging of the nozzle was defined as the number of achievable continuous injections.

In Tables, the term "unsuccessful continuous injection" means that the number of achievable continuous injections is less than 50. The term "successful continuous injection" means that injection could be achieved 50 or more successive times but could not be achieved 300 or more successive times. The term "highly successful continuous injection" means that the thermosetting resin composition could be injected 300 or more successive times.

(Non-Defective Rate)

The molded products obtained from Examples where injection molding could be achieved 50 or more times were visually observed and evaluated in terms of presence or absence of appearance defects, such as the occurrence of voids and the occurrence of cracks. Samples that did not show such appearance defects were determined as non-defective products. For each Example, the non-defective rate of 500 molded products was calculated. The results are shown according to the following notation.

The sign "triangle" indicates that the non-defective rate is not less than 70% and less than 90%.

The sign "circle" indicates that the non-defective rate is not less than 90% and less than 99%.

The sign "double circle" indicates that the non-defective rate is not less than 99%.

Example 2 (Examples 2-1 to 2-7 and Comparative Examples 2-1 to 2-6)

A thermosetting resin composition was prepared in the same manner as in Example 1 except that (B) magnetic powder was used as the inorganic filler in place of (A) silica, and injection molding was performed in the same manner as in Example 1. The magnetic powder was prepared in the following manner. Added to the magnetic fluid described above was the same amount (volume) of ethanol (85% aqueous solution), followed by stirring and then flocculation for 24 hours. Ethanol was filtered out of the resultant sediment to obtain a flocculated sediment of magnetic particles. The obtained flocculated sediment was evened out, dried by heating for eight hours in a convection oven raised to 115° C., and then allowed to stand and cool for two hours, thus obtaining magnetic powder.

Table 3 shows results of evaluation of how many times the thermosetting resin composition could be continuously injected (Examples 2-1 to 2-7 and Comparative Examples 2-1 to 2-6), wherein the evaluation was made in the same manner as in Example 1. Furthermore, Table 3 also shows the result of evaluation made on molded states of resultant molded products in the same manner as in Example 1.

In Comparative Examples 1-1 to 1-6, the nozzle was clogged with cured resin by about five injections and injection molding could not be continuously performed any more. The reason for this can be that since the preset temperature of the nozzle was 15° C. or more higher than the cure onset temperature of the thermosetting resin composition under the molding conditions in Comparative Examples 1-1 to 1-6, at least part of the thermosetting resin composition was converted to a C-stage state (fully cured) by the curing reaction of the thermosetting resin composition. In contrast, under the temperature conditions in Examples 1-1 to 1-7, injection molding could be continuously achieved 50 or more successive times. The reason for this can be that since the preset temperatures of the cylinder body and nozzle were equal to or lower than the cure onset temperature of the thermosetting resin composition, the thermosetting resin composition was held in a B-stage state even when the curing reaction had occurred.

It was confirmed from Examples 1-1 to 1-7 that the non-defective rate was further improved by controlling the preset temperature of the cylinder body, the preset temperature of the nozzle, and the mold temperature. In this respect, Example 1-2 where the mold temperature at the end of molding was 40° C. was found to have slight flow defect, but Example 1-3 where the mold temperature at the end of molding was 20° C. was found to have no such defect. Furthermore, because in the examples a phenomenon occurs in which the resin adheres to the mold at a mold temperature of above 35° C., the mold temperature can be considered to be preferably 35° C. or less.

Moreover, Example 1-6 where the preset temperature of the downstream portion of the cylinder body was 95° C. exhibited a non-defective rate of less than 99% and was found to slightly develop cracks. On the other hand, Example 1-7 where the preset temperature of the downstream portion of the cylinder body was 90° C. exhibited a non-defective rate of approximately 100% and was found to develop no crack. It can be believed from the above that the preset temperature of the cylinder body is preferably 20° C. or more lower than the cure onset temperature of the thermosetting resin composition.

Furthermore, it was found that when the nozzle temperature was 10° C. or more lower than the cure onset temperature of the thermosetting resin composition, a better molded product could be obtained.

Next, each of the molded products obtained in Examples 1-6 and 1-7 was separated by cutting into parts to be articles and unnecessary parts using a hot nipper. Then, the unnecessary parts were ground using a cutter mixer. The ground product was mixed into the thermosetting resin composition (fresh material) described above to give a weight ratio (reused resin to fresh resin) of 10:100. Then, this mixture was injection-molded under the same conditions as in Examples 1-6 and 1-7. As a result, both the mixtures could be continuously injection-molded 50 or more successive times. Furthermore, the non-defective rates of the resultant molded products were 90% or more. As a result of the above, it was confirmed that the injection molding method according to the present invention enables continuous injection molding of a thermosetting resin and reuse of unnecessary parts produced during the molding.

Table 3 shows results of Examples 2-1 to 2-7 and Comparative Examples 2-1 to 2-6 in all of which magnetic powder was used as the inorganic filler. These examples and comparative examples generally exhibited substantially the same tendency as in Examples 1-1 to 1-7 and Comparative Examples 1-1 to 1-6 in all of which silica was used as the inorganic filler.

Furthermore, photographing the cross-sections of the samples of Examples 2-7 and 2-1 by X-ray CT showed the occurrence of cracks in Example 2-1 but showed the occurrence of no crack in Example 2-7. The reason for this can be that since the temperatures of the cylinder body and nozzle in Example 2-7 were controlled to be at lower temperatures, the gasification of the dispersant coated on the surface of magnetic powder serving as the inorganic filler was more effectively restrained. It was confirmed that in the injection molding method according to the present invention suitable temperature settings enable even a thermosetting resin composition containing an inorganic filler containing a volatile component to be continuously molded into an excellent molded product.

REFERENCE SIGNS LIST

100 . . . injection molding machine
200 . . . resin composition supply section
   210 . . . hopper
300 . . . injecting section
   310 . . . cylinder
   311 . . . internal space
   312 . . . body
   320 . . . screw
   330 . . . screw rotating device
   340 . . . screw moving device
   350 . . . nozzle
400 . . . temperature control section
   410 . . . heater
   411 . . . upstream heater
   412 . . . midstream heater
   413 . . . downstream heater
   414 . . . nozzle heater
   420 . . . cooler
   421 . . . cooling pipe
500 . . . mold installation section
   510 . . . mold
   511 . . . flow channel
   512 . . . filling portion
520 . . . opening and closing device

The invention claimed is:

1. A method for injection-molding a thermosetting resin composition, comprising: injecting a thermosetting resin composition into a mold while a curing reaction of the thermosetting resin composition is incomplete, wherein a mold temperature is 35° C. or less; controlling a temperature of the thermosetting resin composition according to its cure temperature, thereby maintaining a semi-cured state without completely curing the thermosetting resin; and removing the injected thermosetting resin composition in a state of a semi-cured product from the mold without further heating; wherein the thermosetting resin composition is injected from a cylinder into the mold and the cylinder comprises a body and a nozzle provided at a distal end of the body; and a temperature of the body is set to be 20 to 30° C. lower than a curing reaction onset temperature of the thermosetting resin composition; and a temperature of the nozzle is set to be 15 to 20° C. higher than the temperature of the body.

2. The method for injection-molding a thermosetting resin composition according to claim 1, wherein the thermosetting resin composition is converted to a state of the semi-cured product in the mold.

3. The method for injection-molding a thermosetting resin composition according to claim 1, wherein after the thermosetting resin composition is injected and before being removed from the mold, the thermosetting resin composition is cooled in the mold until becoming solidified.

4. The method for injection-molding a thermosetting resin composition according to claim 3, wherein after the solidified thermosetting resin composition is removed from the mold, the thermosetting resin composition is separated by cutting into a part to be an article and an unnecessary part.

5. The method for injection-molding a thermosetting resin composition according to claim 4, wherein the part to be an article is then heated to progress a thermosetting reaction of the thermosetting resin composition.

6. The method for injection-molding a thermosetting resin composition according to claim 4, wherein the unnecessary part is used as a reworked raw material.

7. The method for injection-molding a thermosetting resin composition according to claim 6, wherein the unnecessary part is ground, a resultant ground product is mixed with a fresh thermosetting resin composition, and a resultant mixture is used to perform injection molding.

8. The method for injection-molding a thermosetting resin composition according to claim 1, wherein the thermosetting resin composition is removed from the mold after the thermosetting resin composition reaches a temperature 50° C. or more lower than a cure temperature of the resin composition.

9. A method for injection-molding a thermosetting resin composition, comprising: injecting a thermosetting resin composition into a mold while a curing reaction of the thermosetting resin composition is incomplete, wherein a mold temperature is 35° C. or less; controlling a temperature of the thermosetting resin composition according to its cure temperature, thereby maintaining a semi-cured state without completely curing the thermosetting resin; removing the injected thermosetting resin composition in a state of a semi-cured product from the mold without further heating; and preventing application of heat to complete curing of the injected thermosetting resin so as to maintain plasticity of the injected thermosetting resin; wherein the thermosetting resin composition is injected from a cylinder into the mold and the cylinder comprises a body and a nozzle provided at a distal end of the body; and a temperature of the body is set to be 20 to 30° C. lower than a curing reaction onset temperature of the thermosetting resin composition; and a temperature of the nozzle is set to be 15 to 20° C. higher than the temperature of the body.

* * * * *